United States Patent
Tsukitani et al.

(10) Patent No.: US 6,404,950 B1
(45) Date of Patent: Jun. 11, 2002

(54) DISPERSION-COMPENSATING MODULE

(75) Inventors: Masao Tsukitani; Eisuke Sasaoka; Toshiaki Okuno; Shigeru Tanaka, all of Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/452,103

(22) Filed: Dec. 2, 1999

(30) Foreign Application Priority Data

Dec. 2, 1998 (JP) .......................................... 10-343115

(51) Int. Cl.⁷ ................................................ G02B 6/26
(52) U.S. Cl. .............................. 385/27; 385/31; 385/37; 385/15; 359/161
(58) Field of Search .............................. 385/27, 15, 31, 385/37, 39; 359/161

(56) References Cited

U.S. PATENT DOCUMENTS

| | | | |
|---|---|---|---|
| 5,703,978 A | | 12/1997 | DiGiovanni et al. |
| 5,966,228 A | * | 10/1999 | Akiba et al. ................. 359/173 |
| 6,154,588 A | * | 11/2000 | Kai .............................. 385/27 |
| 6,157,754 A | * | 12/2000 | Sasaoka et al. ............... 385/24 |
| 6,192,179 B1 | * | 2/2001 | Berkey et al. ............... 385/126 |

FOREIGN PATENT DOCUMENTS

| | | | |
|---|---|---|---|
| JP | 8-220370 | * | 8/1996 |
| JP | 11-119030 | | 4/1999 |
| WO | WO99/30445 | | 6/1999 |

* cited by examiner

Primary Examiner—Rodney Bovernick
Assistant Examiner—Sung Pak
(74) Attorney, Agent, or Firm—McDermott, Will & Emery

(57) ABSTRACT

The present invention relates to a dispersion-compensating module having a structure which compensates for the dispersion of an optical transmission line in a 1.55-$\mu$m wavelength band and adjusts loss fluctuations among signal wavelengths in the 1.55-$\mu$m wavelength band into an appropriate range. The dispersion-compensating module comprises a structure adapted to be installed in an already installed optical fiber transmission line, and has a loss slope with a polarity opposite to that of the optical fiber transmission line in the 1.55-$\mu$m wavelength band. One application of the dispersion-compensating module comprises a dispersion-compensating optical fiber as a dispersion-compensating device, and an optical fiber doped with a transition metal element as a loss-equalizing device. By the above configuration, the loss fluctuations among individual signal wavelengths in the whole transmission line including the dispersion-compensating module can be adjusted by the loss-equalizing device in the dispersion-compensating module so as to fail within an appropriate range.

8 Claims, 13 Drawing Sheets

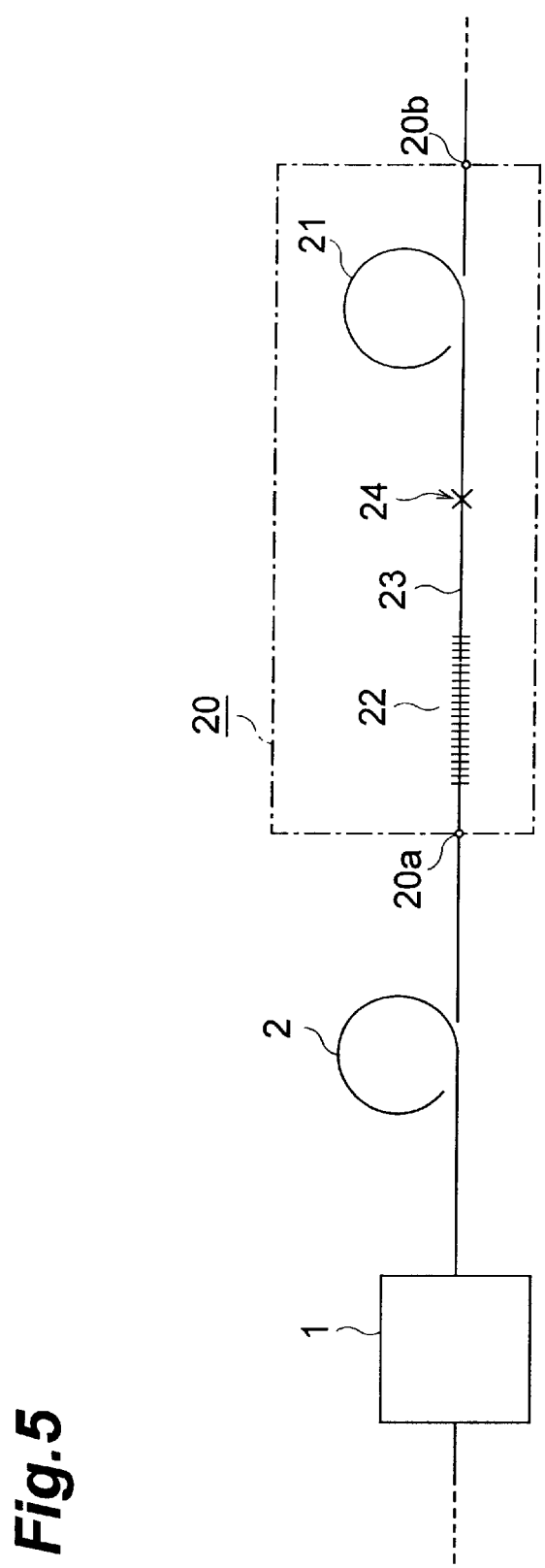

DISPERSION-COMPENSATING MODULE

BACKGROUND OF THE INVENTION

1. Field of the Invention

The present invention relates to a dispersion-compensating module which improves the transmission quality of large-capacity, high-speed optical transmission systems of WDM (Wavelength Division Multiplexing) type.

2. Related Background Art

A WDM type optical transmission system is a system which transmits a plurality of signal light components within a 1.55-$\mu$m wavelength band (1.53 $\mu$m to 1.57 $\mu$m) by way of an optical fiber transmission line network, and enables large-capacity, high-speed optical communications. This optical transmission system comprises an optical amplifier for optically amplifying a plurality of signal light components, collectively, and the like, in addition to an optical fiber line which is a transmission medium. In such WDM communications, various studies and developments are under way in order to enable communications with further larger capacity and higher speed.

One of important subjects to be studied concerning the optical transmission line is reduction of dispersion in a signal wavelength band. Namely, each signal light component has a certain bandwidth even though it is monochromatic. As a result, when dispersion occurs in the signal wavelength band in the optical transmission line, the signal light components having reached a receiving station by way of the optical transmission line after being sent out from a transmitting station deform their waveforms, thereby deteriorating their reception. Therefore, in the signal wavelength band, it is desirable that the dispersion in the optical transmission line be as small as possible.

However, standard single-mode optical fibers (hereinafter referred to as SMF), having a zero-dispersion wavelength in a 1.3-$\mu$m wavelength band, already installed as an optical transmission line have a dispersion of about 16 ps/nm/km in a wavelength band of 1.53 $\mu$m to 1.57 $\mu$m which is used in WDM communications. Many of already installed optical transmission lines are constituted by such an SMF. Therefore, a dispersion-compensating module is disposed within a repeater in order to compensate for the dispersion of the optical transmission line, while making use of such an already installed optical transmission line.

With respect to the dispersion over the whole length of the optical transmission line to be compensated for, the dispersion-compensating module generates a dispersion having an opposite polarity with substantially the same absolute value. Specifically, the dispersion-compensating module comprises a dispersion-compensating optical fiber having a dispersion with a polarity opposite to that of the dispersion of the optical transmission line (including SMF), and compensates for the dispersion of the optical transmission line (including SMF) by adjusting the dispersion-compensating optical fiber to an appropriate length. Also, for reducing the size of the dispersion-compensating module, it is a common practice to wind the dispersion-compensating optical fiber into a coil having a small diameter.

SUMMARY OF THE INVENTION

The inventors have studied conventional dispersion-compensating modules and, as a result, have found out the following problems.

Recently, in optical amplifiers, the width of a signal wavelength band which can collectively be optically amplified has been expanded, and gain deviations in optically amplifiable signal wavelength bands have been reduced in order to improve the versatility thereof. On the other hand, inter-wavelength loss deviations (fluctuations in loss among signal wavelengths) occurring in the optical transmission line in the signal wavelength band are too large to neglect. Also, since inter-wavelength loss deviations in the signal wavelength band occur to a certain extent in a dispersion-compensating optical fiber as well, it is necessary to improve loss deviations in the whole transmission line including the conventional dispersion-compensating modules.

When a plurality of stages of conventional dispersion-compensating modules and optical amplifiers are disposed in such an optical transmission line; even if a plurality of signal light components sent out from a transmitting station exhibit no inter-wavelength optical power deviation at the time when sent out, they will generate an optical power deviation, due to inter-wavelength loss deviations, while they are propagating through the optical transmission line and conventional dispersion-compensating modules, and the optical power deviation is expanded by optical amplifiers having a small gain deviation. Since inter-wavelength optical power deviations are accumulated in the plurality of signal light components reaching the receiving station, a part of the signal light components may become weak, thereby generating reception errors.

In order to overcome the above-mentioned problems, it is an object of the present invention to provide a dispersion-compensating module having a structure which compensates for the dispersion of optical transmission lines in a 1.55-$\mu$m wavelength band (1.53 $\mu$m to 1.57 $\mu$m) and adjusts loss fluctuations among signal wavelengths into an appropriate range.

The dispersion-compensating module according to the present invention is generally installed between repeaters together with an optical amplifier, whereas the object to be compensated for thereby is an SMF which is laid between a transmitting station and a receiving station, between repeater stations, between the transmitting station and a repeater station, or between a repeater station and the receiving station. For being installed on an already installed optical fiber transmission line and constituting a part of the line, the dispersion-compensating module comprises an input end for capturing signal lights propagating through the optical fiber transmission line and an output end for sending out the signal lights into the optical fiber transmission line, has a positive loss slope in a 1.55-$\mu$m wavelength band, and further comprises a structure for allowing the dispersion generated in a predetermined length of the optical fiber transmission line to be compensated for and loss deviations among individual signal wavelengths to be adjusted into an appropriate range.

Specifically, the dispersion-compensating module according to the present invention comprises a dispersion-compensating device and a loss-equalizing device. The dispersion-compensating device compensates for the dispersion of the above-mentioned optical fiber transmission line in the 1.55-$\mu$m wavelength band. Also, for compensating for the wavelength dependence of loss in at least the above-mentioned optical fiber transmission line and dispersion-compensating device, the loss-equalizing device adjusts the total loss slope of the optical fiber transmission line including the dispersion-compensating module such that the loss deviations among individual signal wavelengths in the 1.55-$\mu$m wavelength band caused by propagation in the optical fiber transmission line and dispersion-compensating device falls within the appropriate range.

In this specification, "loss slope" refers to the gradient of a graph indicating the wavelength dependence of transmission loss. Also, the above-mentioned optical fiber transmission line is an SMF having a zero-dispersion wavelength in a 1.3-μm wavelength band; and, letting L be the length of the above-mentioned SMF, and Cr be the absolute value of a permissible manufacturing error, the total loss slope (dB/nm) of the dispersion-compensating module in the 1.55-μm wavelength band is greater than 0 but not greater than 0.000175×L+α. In general, when an SMF having a zero-dispersion wavelength in a 1.3-μm wavelength band is employed as an optical fiber transmission line, the loss slope per unit length of the SMF is about −0.000175 (dB/nrn/km=dB/(nm·km)). Therefore, the total loss slope of the dispersion-compensating module is ideally +0.000175×L when an SMF having a length of L is concerned. In practice, however, since the manufacturing error α cannot be neglected, the loss slope (dB/nm) of the dispersion-compensating module in the 1.55-μm wavelength band is greater than 0 but not greater than 0.000175×L+α. The loss-equalizing device controls the loss slope of the whole modules such that the total loss slope of the optical fiber line, which includes the dispersion-compensating device in the module, falls within an appropriate range.

The loss-equalizing device includes an optical fiber, comprising a core region doped with a transition metal element and a cladding region disposed at an outer periphery of the core region, in which a single mode is secured in the 1.55-μm wavelength band. The transition metal element preferably include Cr or Co, and the amount of compensation of loss in the loss-equalizing device can be adjusted when the kind of the transition metal element and the amount of addition thereof are appropriately regulated.

The above-mentioned loss-equalizing device may include an optical fiber formed with a long-period grating in which a propagation mode and a radiation mode are coupled to each other. Alternatively, the above-mentioned dispersion-compensating device may be an optical device having, as the above-mentioned loss-equalizing device, a long-period grating in which a propagation mode and a radiation mode are coupled. to each other. In each of these configurations, the long-period grating, which functions as the loss-equalizing device, enables loss deviations among individual signal wavelengths to be adjusted in the whole optical transmission line without increasing the transmission loss of the whole dispersion-compensating module. In particular, in the configuration in which the long-period grating, which functions as the loss-equalizing device, is formed in the optical fiber functioning as the dispersion-compensating device, the dispersion-compensating device does not have a connecting portion which may yield loss. Consequently, it is not necessary to take account of influences of transmission loss in the connecting portion, whereby loss fluctuations among individual wavelengths can be adjusted more easily. Here, as explicitly shown in U.S. Pat. No. 5,703,978, the long-period grating is a grating which induces coupling (mode coupling) between a core mode and a cladding mode which propagate through an optical fiber, and is clearly distinguished from a short-period grating for reflecting light centered at a predetermined wavelength. Also, in the long-period grating, for yielding a strong power conversion from the core mode to the cladding mode, the grating period (pitch) is set such that the optical path difference between the core mode and the cladding mode becomes 2π. As a consequence, since the long-period grating acts so as to couple the core mode to the cladding mode, the core mode attenuates over a narrow band centered at a predetermined wavelength (hereinafter referred to as "loss wavelength").

The above-mentioned loss-equalizing device can also be realized by fusion-splicing respective end portions of a pair of optical fibers by fusion. In this case, the fused portion of the pair of optical fibers functions as the loss-equalizing device.

Preferably, the optical axes of the pair of optical fibers are shifted from each other in the fused portion. This fused portion can also be realized by fusion-splicing the pair of optical fibers while their core regions are bent. Also, when a pair of optical fibers each having a core region with an outside diameter expanding toward the opposed portion is fusion-spliced to each other, the fused portion can function as the loss-equalizing device.

Further, the loss-equalizing device may include a fiber coupler, or an optical fiber bent at one or more parts thereof. A desirable loss wavelength characteristic can be obtained in each of these cases.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 3A is a graph showing the loss wavelength characteristic of a standard single-mode optical fiber having a zero-dispersion wavelength in a 1.3-μm wavelength band, whereas

FIG. 4A is a graph showing an example of the loss wavelength characteristic of a loss-equalizing optical fiber whose core region is doped with Co element (transition metal element), whereas

FIG. 5 is a view showing a schematic configuration of a second embodiment of the dispersion-compensating module according to the present invention;

DESCRIPTION OF THE PREFERRED EMBODIMENTS

In the following, embodiments of the dispersion-compensating module according to the present invention will be explained with reference to FIGS. 1, 2A to 4B, 5 to 7, 8A to 8D, 9, 10A to 10C, and 11 to 13. In the explanation of the drawings, constituents identical to each other will be referred to with numerals or letters identical to each other without repeating their overlapping descriptions.

First Embodiment

Figure 1:
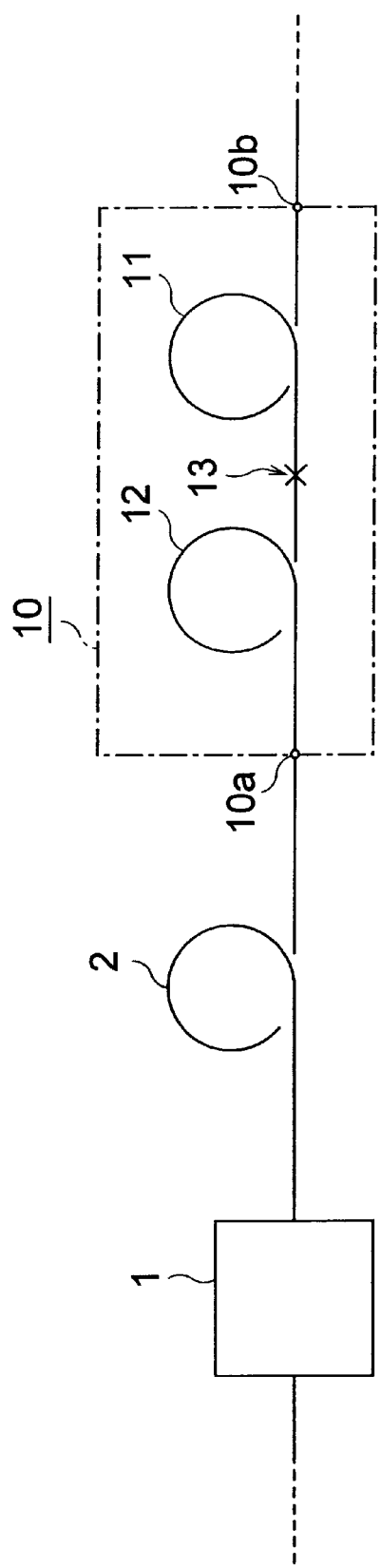
FIG. 1 is a viewing a schematic configuration of a first embodiment of the dispersion-compensating module according to the present invention.

To begin with, a first embodiment of the dispersion-compensating module according to the present invention will be explained. FIG. 1 is a view showing a schematic configuration of the dispersion-compensating module according to the first embodiment. This drawing shows, in addition to the dispersion-compensating module 10 according to this embodiment, a repeater 1 disposed upstream of the dispersion-compensating module 10, and an optical transmission line 2 between the repeater 1 and the dispersion-compensating module 10.

The dispersion-compensating module 10 according to this embodiment has an input end 10a and an output end 10b, and is disposed in a state where a dispersion-compensating device and a loss-equalizing device are optically connected to each other in the optical path between the input end 10a and the output end 10b. In particular, the dispersion-compensating module 10 is constituted by a dispersion-compensating optical fiber 11, as the dispersion-compensating device, and an optical fiber 12 doped with a transition metal element, as the loss-equalizing device, which are fusion-spliced to each other at a connecting portion 13.

The dispersion-compensating optical fiber 11 is an optical device which compensates for the chromatic dispersion in the WDM signal wavelength band of the optical transmission line 2 into which the dispersion-compensating module 10 is inserted. On the other hand, the transition-metal-element-doped optical fiber 12 is an optical fiber, basically comprising a core region and a cladding region disposed at the outer periphery of the core region, in which a transition metal element such as Cr element, Co element, or the like is added at least into the core region. When the kind and amount of the transition metal element added to the core region are appropriately selected, then the loss wavelength characteristic of the optical fiber 12 itself is adjusted so as to compensate for wavelength-dependent loss deviations of the optical transmission line 2 and dispersion-compensating optical fiber 11. As a consequence, the total loss fluctuation in the signal wavelength band of the optical transmission line 2 provided with the dispersion-compensating module 10 decreases.

Figure 2A:
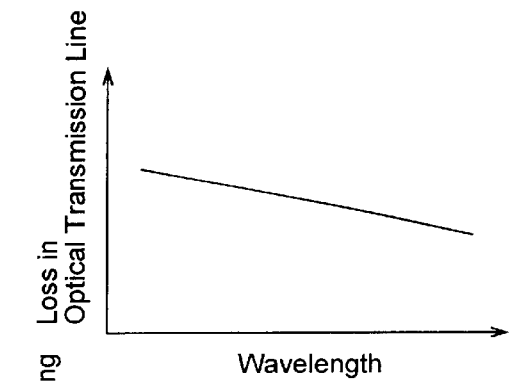
FIGS. 2A to 2E are graphs showing relationships between loss and wavelength in respective parts in each of dispersion-compensating modules according to first, second, fourth, fifth, and sixth embodiments.
Figure 2B:
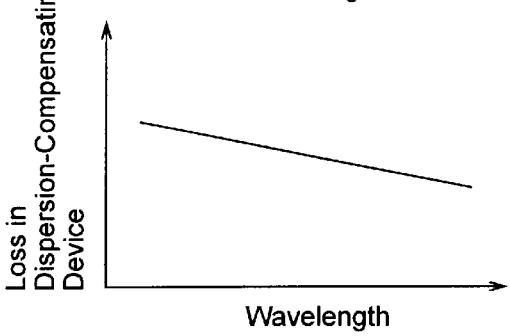
Figure 2C:
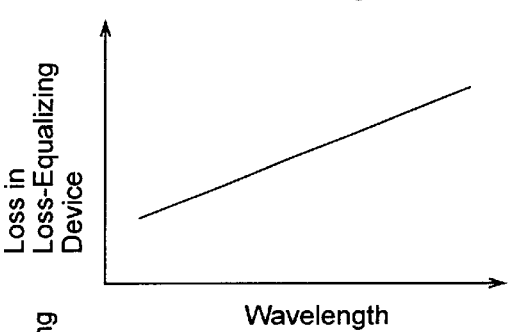
Figure 2D:
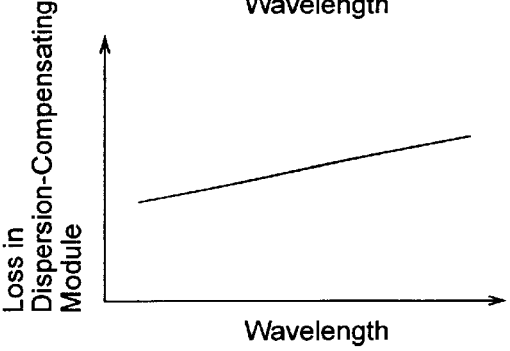
Figure 2E:
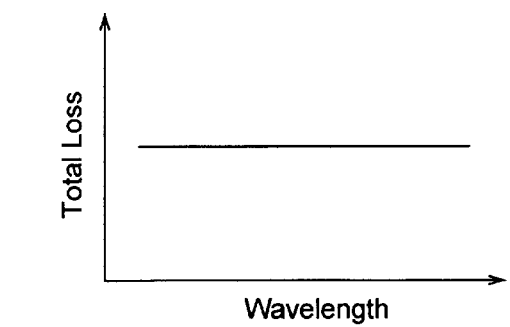

FIGS. 2A to 2E are graphs showing relationships between transmission loss and wavelength in respective parts in the dispersion-compensating module according to first embodiment. In particular, FIG. 2A is a graph showing the relationship between transmission loss and wavelength in a wavelength band of 1.53 $\mu$m to 1.57 $\mu$m in the optical transmission line 2 employing an SMF having a zero-dispersion wavelength in a 1.3-$\mu$m wavelength band. FIG. 2B is a graph showing the relationship between transmission loss and wavelength in the wavelength band of 1.53 $\mu$m to 1.57 $\mu$m in the dispersion-compensating optical fiber 11 functioning as the dispersion-compensating device. FIG. 2C is a graph showing the relationship between transmission loss and wavelength in the wavelength band of 1.53 $\mu$m to 1.57 $\mu$m in the transition-metal-element-doped optical fiber 12 acting as the loss-equalizing device. FIG. 2D is a graph showing the relationship between transmission loss and wavelength in the wavelength band of 1.53 $\mu$m to 1.57 $\mu$m in the whole dispersion-compensating module 10. FIG. 2E is a graph showing the relationship between transmission loss and wavelength in the wavelength band of 1.53 $\mu$m to 1.57 $\mu$m in the whole optical transmission line provided with the dispersion-compensating module 10.

As shown in FIGS. 2A and 2B, each of the optical transmission line 2 and dispersion-compensating optical fiber 11 has a transmission loss which becomes smaller as the wavelength is longer in general in the wavelength band of 1.53 $\mu$m to 1.57 $\mu$m, thus yielding a negative loss slope. In contrast, as shown in FIG. 2C, the transition-metal-element-doped optical fiber 12 is a single-mode optical fiber whose core region is doped with Co element at a concentration of about 10 ppm, which is designed such that its transmission loss becomes greater as the wavelength is longer, so as to be able to compensate for wavelength-dependent loss deviations in view of the loss slopes of the optical transmission line 2 and dispersion-compensating optical fiber 11.

Therefore, as shown in FIG. 2D, the total loss in the dispersion-compensating module 10 is the sum of respective losses in the dispersion-compensating optical fiber 11 and the transition-metal-element-doped optical fiber 12, and becomes greater as the wavelength is longer in the wavelength band of 1.53 $\mu$m to 1.57 $\mu$m, thus yielding a positive loss slope. As shown in FIG. 2E, the total loss in the optical transmission line 2 and the dispersion-compensating module 10 is the sum of their respective losses, and yields a deviation of 0.1 dB or less in the wavelength band of 1.53 $\mu$m to 1.57 $\mu$m, whereby its wavelength dependence is weaker than that of the loss deviation of each constituent.

Figure 3A:
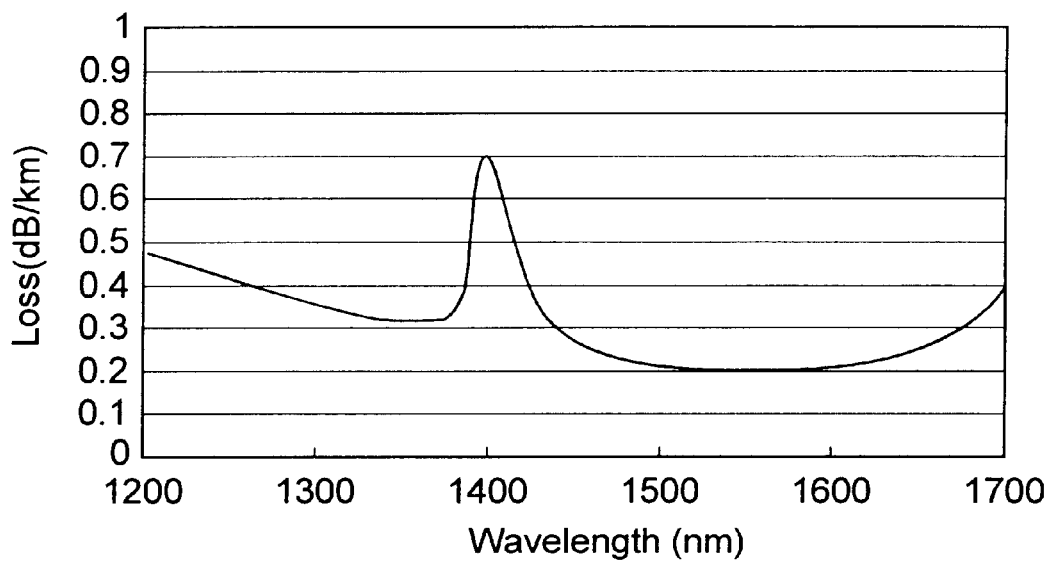
Figure 3B:
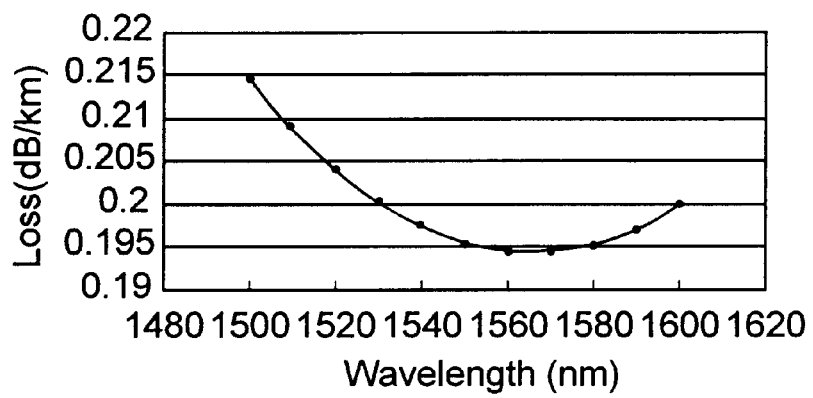
FIG. 3B is a graph showing, to a larger scale, the loss wavelength characteristic of the single-mode optical fiber in the vicinity of a 1.5-μm wavelength band in the graph shown in FIG. 3A.

FIGS. 3A and 3B are graphs showing the loss wavelength characteristic of a standard SMF having a zero-dispersion wavelength in a 1.3-$\mu$m wavelength band. The graph of FIG. 3A shows the loss characteristic within a wavelength range of 1200 $\mu$m to 1700 $\mu$m; whereas the graph of FIG. 3B enlarges a part of FIG. 3A, so as to show the loss characteristic within a wavelength range of 1480 $\mu$m to 1620 $\mu$m. This SMF has a stepped index type refractive index profile, whose core region is doped with Ge element while silica is used as a base. As shown in these graphs, the loss in this SMF per unit length (km) varies about 0.007 dB/km between wavelengths of 1530 nm and 1570 nm. In the wavelength band having a width of 40 nm (=1570 nm–1530 nm), the loss slope of the SMF per unit length is approximately −0.007/40=−0.000175 dB/nm/km (whereby the loss on the longer wavelength side tends to become smaller).

Figure 4A:
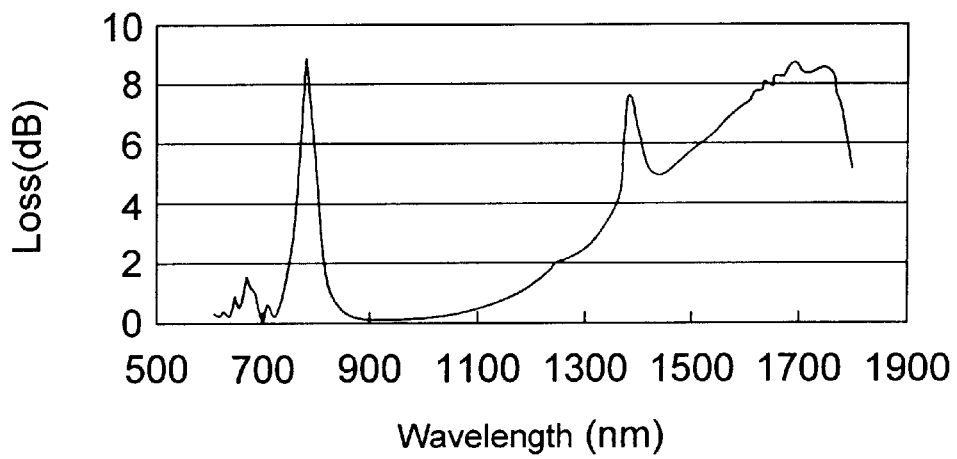
Figure 4B:
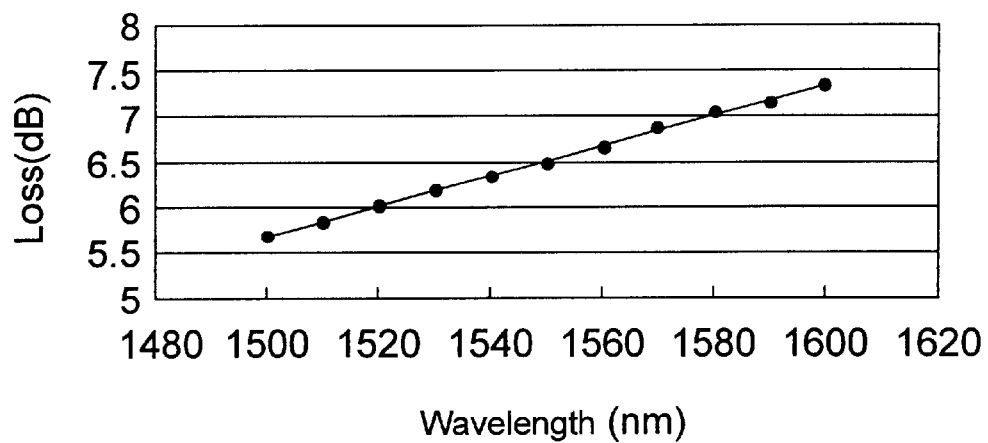
FIG. 4B is a graph showing, to a larger scale, the loss wavelength characteristic of the loss-equalizing optical fiber in the vicinity of the 1.5-μm wavelength band in the graph shown in FIG. 4A.

FIGS. 4A and 4B are graphs showing an example of the loss wavelength characteristic of a loss-equalizing optical fiber whose core region is doped with Co element. The graph of FIG. 4A shows the loss characteristic within a wavelength range of 600 μm to 1800 μm; whereas the graph of FIG. 4B enlarges a part of FIG. 4A, so as to show the loss characteristic within a wavelength range of 1500 μm to 1600 μm. This loss-equalizing optical fiber has a stepped index type refractive index profile, whose core region is doped with Co element while silica is used as a base. As shown in these graphs, the loss slope of this loss-equalizing optical fiber is positive in the wavelength band of 1.53 μm to 1.57 μm. This loss slope can be adjusted by the amount of addition of Co element land the like.

When the SMF is used as the optical transmission line 2, the loss slope of the optical transmission line 2 in the wavelength band of 1.53 μm to 1.57 μm is negative as mentioned above. Therefore, if the loss slope of the whole dispersion-compensating module 10 is set positive, then the total loss in the optical transmission line 2 and dispersion-compensating module 10 can fall within an appropriate range.

Specifically, since the SMF employed as the optical transmission line 2 has al loss slope per unit length of about −0.000175 dB/nm/km (=dB/(nm·km)) in the wavelength band of 1.53 μm to 1.57 μm, letting L (km) be the fiber length of the optical transmission line 2, the loss slope (dB/nm) of the whole dispersion-compensating module 10 in the wavelength band of 1.53 μm to 1.57 μm is ideally a value which is greater than 0 but not greater than 0.000175× L+α.

The loss slope of the loss-equalizing optical fiber (loss-equalizing device) is set to an appropriate value by adjusting the amount of addition of Co element or the like, such that, while the loss slope of the dispersion-compensating optical fiber (dispersion-compensating device) is taken into consideration, the loss slope of the whole dispersion-compensating module 10 falls within the range mentioned above. In practice, however, the manufacturing error of the loss-equalizing optical fiber must be taken into consideration, whereby the loss slope value S (dB/nm) of the whole dispersion-compensating module 10 becomes $0<S \leq 0.000175L+\alpha$ where α is the absolute value of manufacturing error of the loss-equalizing optical fiber, which is specifically about 0.005 dB/nmn (=0.2/(1530−1570)=0.2/40). This value of manufacturing error means that a difference between a maximum loss and a minimum loss in the wavelength range from 1530 nm to 1570 nm (wavelength width of 40 nm) is 0.2 dB.

When the loss slope of the loss-equalizing optical fiber is controlled as such, the loss deviations among individual wavelengths occurring in the optical transmission line 2 exceeding, for example, 80 km and the dispersion-compensating optical fiber can fall within an appropriate range in the dispersion-compensating module 10 as a whole.

Second Embodiment

A second embodiment of the dispersion-compensating module according to the present invention will now be explained. FIG. 5 is a view showing a schematic configuration of the dispersion-compensating module according to the second embodiment. This drawing shows, in addition to the dispersion-compensating module 20 according to this embodiment, a repeater 1 disposed upstream of the dispersion-compensating module 20, and an optical transmission line 2 between the repeater 1 and the dispersion-compensating module 20.

The dispersion-compensating module 20 according to this embodiment has an input end 20a and an output end 20b, and is disposed in a state where a dispersion-compensating device and a loss-equalizing device are optically connected to each other in the optical path between the input end 20a and the output end 20b. In particular, the dispersion-compensating module 20 is constituted by a dispersion-compensating optical fiber 21, as the dispersion-compensating device, and an optical fiber 23 formed with a long-period fiber grating 22, as the loss-equalizing device, which are fusion-spliced to each other by at a connecting portion 24. The optical fiber 23 is preferably an SMF or dispersion-compensating optical fiber having a zero-dispersion wavelength in a 1.3-μm wavelength band.

The dispersion-compensating optical fiber 21 is an optical device for compensating for the chromatic dispersion in the WDM signal wavelength band of the optical transmission line into which the dispersion-compensating module 20 is inserted. The long-period fiber grating 22 is obtained when a refractive index change having a predetermined period is generated in at least a core region of the optical fiber 23, in which the period of refractive index change is a long period on the order of several hundreds of micrometers, whereby the core-mode light propagating through the core region and the cladding-mode light radiated to the cladding region are coupled together. By appropriately selecting the period of refractive index change and length, the long-period fiber grating 22 is designed such that, for example, the transmission loss at a wavelength of 1520 nm is minimized, while the transmission loss at a wavelength of 1570 nm is maximized, whereby wavelength-dependent loss deviations of the optical transmission line 2 and the dispersion-compensating optical fiber 21 are compensated for.

Therefore, the wavelength dependence of the total loss in the optical transmission line 2 and dispersion-compensating module 20 is weaker than that of the loss deviation in each of the dispersion-compensating optical fiber 21 and long-period fiber grating 22. When the long-period fiber grating 22 is thus used as the loss-equalizing device, loss deviations among individual signal light components can fall within an appropriate range without greatly decreasing the transmission loss in the whole dispersion-compensating module 20. Also, desirable transmission characteristics can easily be obtained in a wide wavelength band. Here, the long-period fiber grating 22 is an optical component which is clearly distinguished from a short-period fiber grating which reflects only a signal light component having a predetermined wavelength (see U.S. Pat. No. 5,7031,978).

Since graphs showing the relationships between transmission loss and wave length in the dispersion-compensating module 20 according to the second embodiment are similar to FIGS. 2A to 2E, operations of the dispersion-compensating module 20 according to this embodiment will be explained with reference to these graphs.

As shown in FIGS. 2A and 2B, each of the optical transmission line 2 and dispersion-compensating optical fiber 21 has a transmission loss which becomes smaller as the wavelength is longer in general in the wavelength band of 1.53 μm to 1.57 μm, thus yielding a negative loss slope. In contrast, as shown in FIG. 2C, the long-period fiber grating 22, which is the loss-equalizing device, is designed such that its transmission loss becomes greater as the wavelength is longer, so as to be able to compensate for wavelength-dependent loss; deviations in view of the loss slopes of the optical transmission line 2 and dispersion-compensating optical fiber 21.

Therefore, as shown in FIG. 2D, the total loss in the dispersion-compensating module 20 is the sum of respective losses in the dispersion-compensating optical fiber 21 and the long-period grating 22, and becomes greater as the wavelength is longer in the wavelength band of 1.53 μm to 1.57 μm, thus yielding a positive loss slope. As shown in FIG. 2E, the total loss in the optical transmission line 2 and the dispersion-compensating module 20 is the sum of their respective losses, and yields a deviation of 0.1 dB or less in the wavelength band of 1.53 μm to 1.57 μm.

Figure 6:
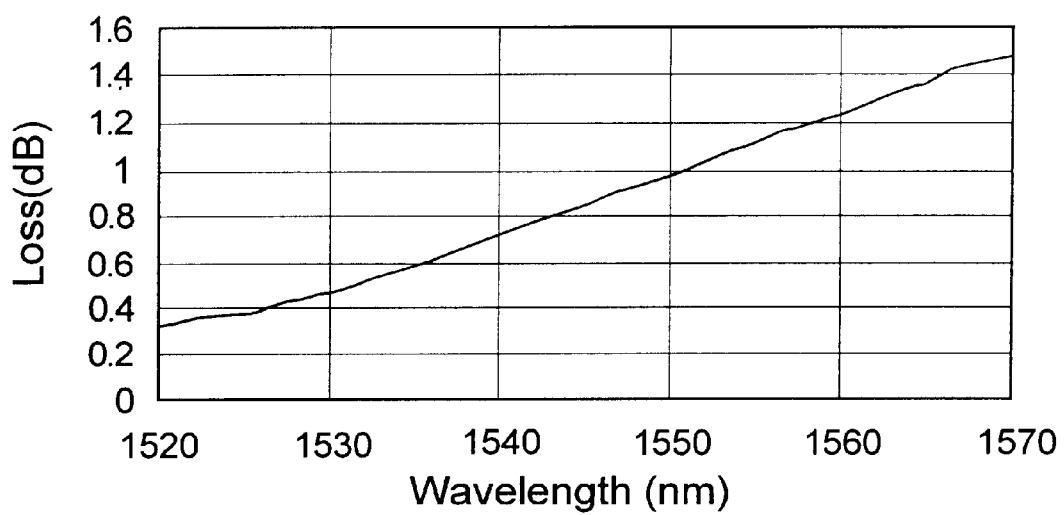
FIG. 6 is a graph showing an example of the loss wavelength characteristic of a long-period grating.

FIG. 6 is a graph showing an example of the loss wavelength characteristic of a long-period fiber grating. For making this long-period fiber grating, a silica-based optical fiber having a stepped index type refractive index profile, whose core region is doped with Ge element, is irradiated with ultraviolet rays through an intensity-modulating mask, so as to generate a refractive index modulation in the core region. As shown in this graph, the loss slope of the long-period fiber grating is positive in the wavelength band of 1.53 μm to 1.57 μm. This loss slope can be adjusted by the period of refractive index change and the grating length.

As mentioned in the foregoing, when the SMF is used as the optical transmission line 2, the loss slope of the optical transmission line 2 in the wavelength band of 1.53 μm to 1.57 μm is negative in this embodiment as well. Therefore, if the loss slope of the whole dispersion-compensating module 20 is set positive, then the total loss in the optical transmission line 2 and dispersion-compensating module 20 can fall within an appropriate range.

Also, since the SMF employed as the optical transmission line 2 has a loss slope per unit length (km) of about −0.000175 dB/nm/km (=dB/(nm·km)) in the wavelength band of 1.53 μm to 1.57 μm, letting L (km) be the fiber length of the optical transmission line 2, and α be the absolute value of a permissible manufacturing error, the loss slope (dB/nm) of the whole dispersion-compensating module 20 in the wavelength band of 1.53 μm to 1.57 μm is preferably a value which is greater than 0 but not greater than 0.000175×L+α.

Here, the loss slope of the long-period grating 22 is adjusted by appropriately setting the grating period and length such that the loss slope of the whole dispersion-compensating module 20 falls within the range mentioned above in view of the loss slope of the dispersion-compensating optical fiber 21.

Third Embodiment

Figure 7:
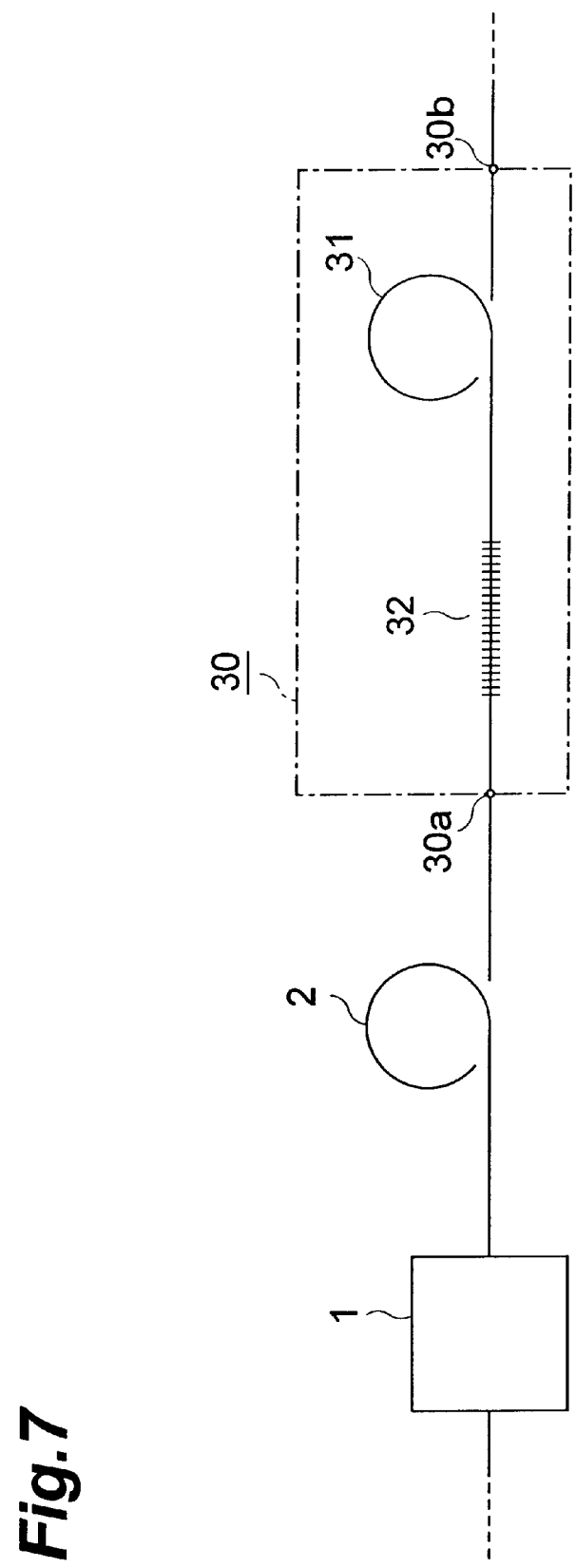
FIG. 7 is a view showing a schematic configuration of a third embodiment of the dispersion-compensating module according to the present invention.

A third embodiment of the dispersion-compensating module according to the present invention will now be explained. FIG. 7 is a view showing a schematic configuration of the dispersion-compensating module according to the third embodiment. This drawing shows, in addition to the dispersion compensating module 30 according to this embodiment, a repeater 1 disposed upstream of the dispersion-compensating module 30, and an optical transmission line 2 between the repeater 1 and the dispersion-compensating module 30.

The dispersion-compensating module 30 according to this embodiment has an input end 30a and an output end 30b, and is disposed in a state where a dispersion-compensating device and a loss-equalizing device are optically connected to each other in the optical path between the input end 30a and the output end 30b. In particular, the dispersion-compensating module 30 is constituted by a dispersion-compensating optical fiber 31, as the dispersion-compensating device, and a long-period fiber grating 32, as the loss-equalizing device, directly formed in the dispersion-compensating optical fiber 31.

The dispersion-compensating optical fiber 31 is an optical device for compensating for the chromatic dispersion in the WDM signal wavelength band of the optical transmission line into which the dispersion-compensating module 30 is inserted. The long-period fiber grating 32 is obtained when a refractive index change having a predetermined period is generated in at least a core region of the dispersion-compensating optical fiber 31, in which the period of refractive index change is a long period on the order of several hundreds of micrometers, whereby the core-mode light propagating through the core region and the cladding-mode light radiated to the cladding region are coupled together. By appropriately selecting the period of refractive index change and the length, the long-period fiber grating 32 is designed such that, for example, the transmission loss at a wavelength of 1520 nm is minimized, while the transmission loss at a wavelength of 1570 nm is maximized, whereby wavelength-dependent loss deviations of the optical transmission line 2 and dispersion-compensating optical fiber 31 are compensated for.

Therefore, the total loss in the optical transmission line 2 and dispersion-compensating module 30 is the sum of the transmission loss in the optical transmission line 2, the original transmission loss in the dispersion-compensating optical fiber 31, and the transmission loss in the formed long-period fiber grating 32, thereby weakening the wavelength dependence as a whole. When the long-period fiber grating 32 is thus used as the loss-equalizing device, loss deviations among individual signal light components can fall within an appropriate range without greatly decreasing the transmission loss in the whole dispersion-compensating module 30. Also, desirable loss characteristics can easily be obtained in a wide wavelength band. Further, in the third embodiment, since the long-period fiber grating 32, as the loss-equalizing device, is directly formed in the dispersion-compensating optical fiber 31, there is no connecting portion which may yield a loss, whereby it is unnecessary to take account of the influence of the loss in the connecting portion.

Figure 8A:
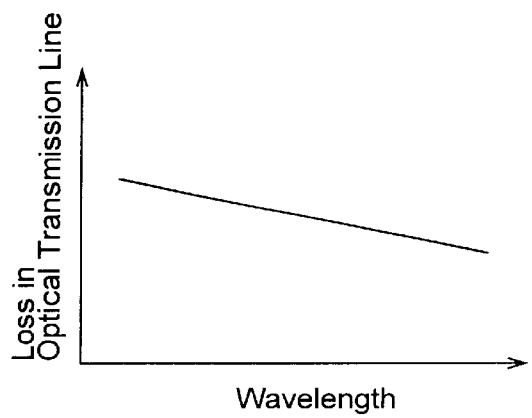
FIGS. 8A to 8D are graphs showing relationships between loss and wavelength in respective parts in the dispersion-compensating module according to the third embodiment shown in FIG. 7.
Figure 8B:
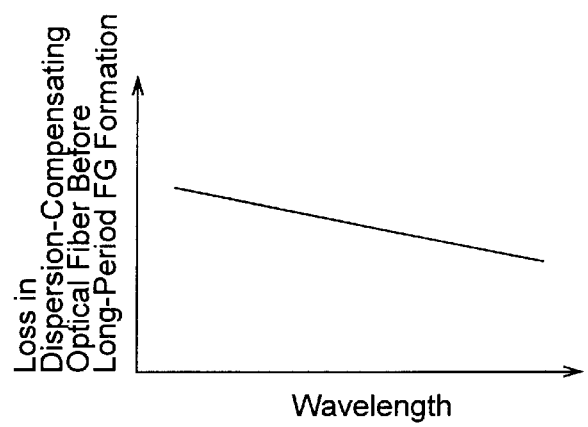
Figure 8C:
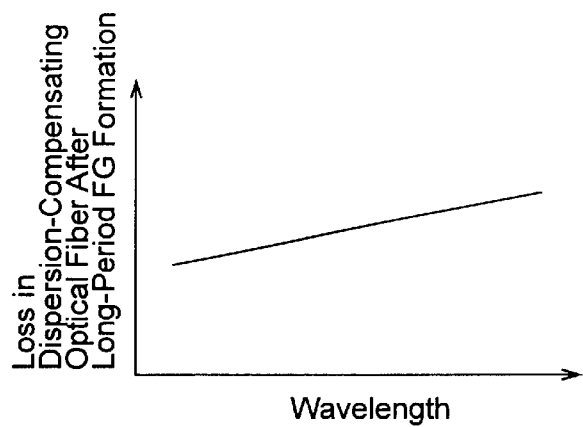
Figure 8D:
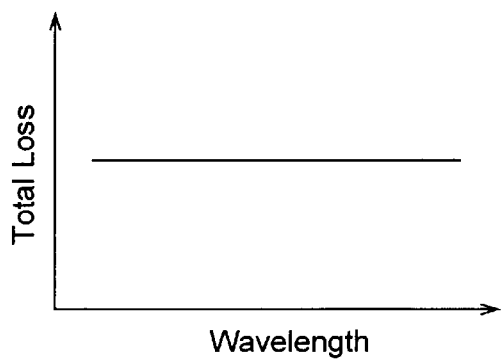

FIGS. 8A to 8D are graphs showing relationships between transmission loss and wavelength in the dispersion-compensating module 30 according to the third embodiment. FIG. 8A is a graph showing the relationship between transmission loss and wavelength in a wavelength band of 1.53 μm to 1.57 μm in the optical transmission line 2 employing the SMF. FIG. 8B is a graph showing the relationship between transmission loss and wavelength in the wavelength band of 1.53 μm to 1.57 μm in the dispersion-compensating optical fiber 31 before the long-period fiber grating 32 is formed. FIG. 8C is a graph showing the relationship between transmission loss and wavelength in the wavelength band of 1.53 μm to 1.57 μm in the dispersion-compensating optical fiber 31 after the long-period fiber grating 32 is formed, i.e., the relationship between transmission loss and wavelength in the wavelength band of 1.53 μm to 1.57 μm in the dispersion-compensating module 30. FIG. 8D is a graph showing the total relationship between transmission loss and wavelength in the wavelength band of 1.53 μm to 1.57 μm in the optical transmission line 2 and dispersion-compensating module 30.

As shown in FIG. 8A, the optical transmission line 2 has a transmission loss which becomes smaller as the wavelength is longer in general in the wavelength band of 1.53 μm to 1.57 μm, thus yielding a negative loss slope. Also, as shown in FIG. 8B., the dispersion-compensating optical fiber 31 before the formation of the long-period fiber grating 32 has a transmission loss which becomes smaller as the wavelength longer in general in the wavelength band of 1.53 μm to 1.57 μm, thus yielding a negative loss slope.

On the other hand, the long-period fiber grating 32 has a loss which becomes greater as the wavelength is longer, thereby compensating for the original loss deviations among individual wavelengths of the optical transmission line 2 and dispersion-compensating optical fiber 31. As shown in FIG. 8C, the total loss in the dispersion-compensating optical fiber 31 formed with the long-period fiber grating 32, i.e., the whole dispersion-compensating module 30, is the sum of the original transmission loss in the dispersion-compensating optical fiber 31 and the transmission loss in the long-period fiber grating 32, and has a positive loss slope in the wavelength band of 1.53 μm to 1.57 μm. As shown in FIG. 8D, the total loss in the optical transmission line 2 and the dispersion-compensating module 30 is the sum of their respective losses, and yields a deviation of 0.1 dB or less in the wavelength band of 1.53 μm to 1.57 μm.

As mentioned in the foregoing, when the SMF is used as the optical transmission line 2, the loss slope of the optical transmission line 2 in the wavelength band of 1.53 μm to 1.57 μm is negative in this embodiment as well. Therefore, if the loss slope of the whole dispersion-compensating module 30 is set positive, then the total loss in the optical transmission line 2 and dispersion-compensating module 30 can fall within an appropriate range.

Also, since the SMF employed as the optical transmission line 2 has a loss slope per unit length (km) of about −0.000175 dB/nm/km (=dB/(nm·km)) in the wavelength band of 1.53 μm to 1.57 μm, letting L (km) be the fiber length of the optical transmission line 2, and α be the absolute value of a permissible manufacturing error, the loss slope (dB/nm) of the whole dispersion-compensating module 30 in the wavelength band of 1.53 μm to 1.57 μm is preferably a value which. is greater than 0 but not greater than 0.000175×L+α.

Here, the loss slope of the whole dispersion-compensating module 30 is adjusted by appropriately setting the grating period and length of the long-period grating 32.

Fourth Embodiment

Figure 9:
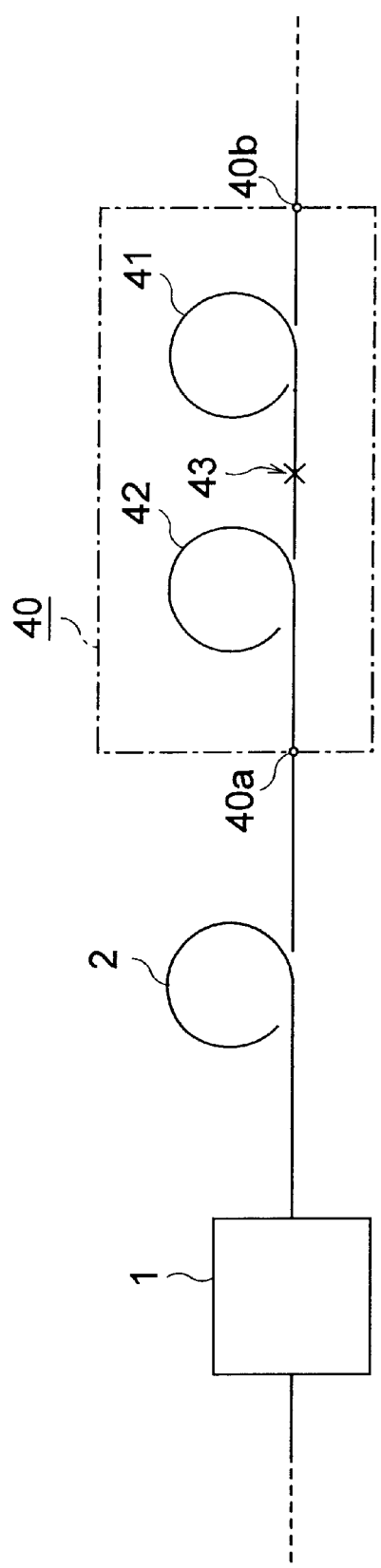
FIG. 9 is a view showing a schematic configuration of a fourth embodiment of the dispersion-compensating module according to the present invention.

A fourth embodiment of the dispersion-compensating module according to the present invention will now be explained. FIG. 9 is a view showing a schematic configuration of the dispersion-compensating module according to the fourth embodiment. This drawing shows, in addition to the dispersion compensating module 40 according to this embodiment, a repeater 1 disposed upstream of the dispersion-compensating module 40, and an optical transmission line 2 between the repeater 1 and the dispersion-compensating module 40.

The dispersion-compensating module 40 according to this embodiment is constituted by a dispersion-compensating optical fiber 41, as a dispersion-compensating device, and a single-mode optical fiber 42 which are fusion-spliced to each other at a fused portion (connecting portion) 43. In this configuration, the dispersion-compensating optical fiber 41 is an optical device which compensates for the chromatic dispersion in the signal light wavelength band of the optical transmission line into which the dispersion-compensating module 40 is inserted. Though the fused portion 43 generates a loss, its wavelength characteristic varies depending on fusion conditions such as the heating temperature upon fusion-splicing and the amount of intrusion of the fiber, whereby the wavelength dependence of transmission loss in the fused portion 43 can be adjusted by appropriately setting these fusion conditions.

Figure 10A:
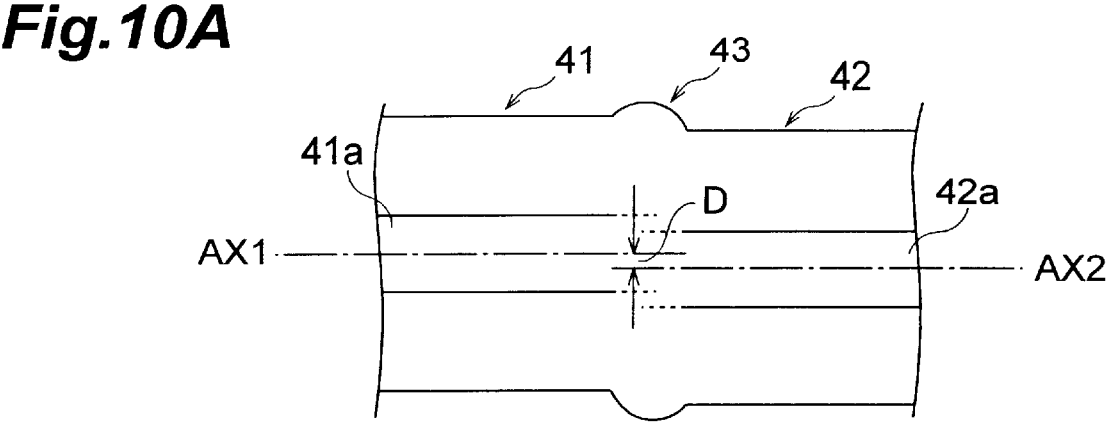
FIGS. 10A to 10C are views for explaining specific configurations of the fused portion as a loss-equalizing device in the dispersion-compensating module according to the fourth embodiment shown in FIG. 9.
Figure 10B:
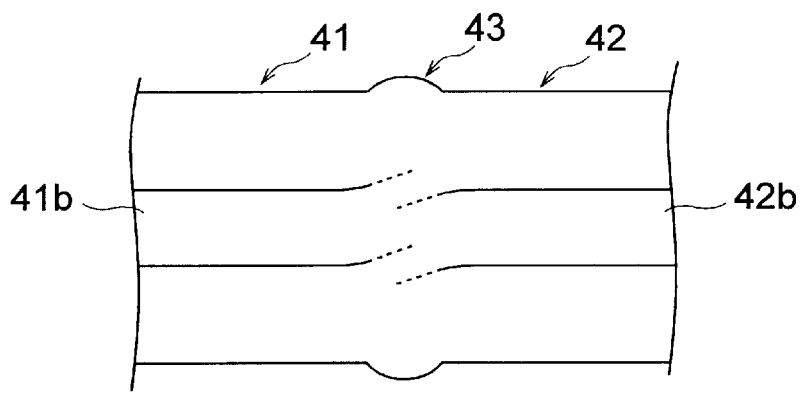
Figure 10C:
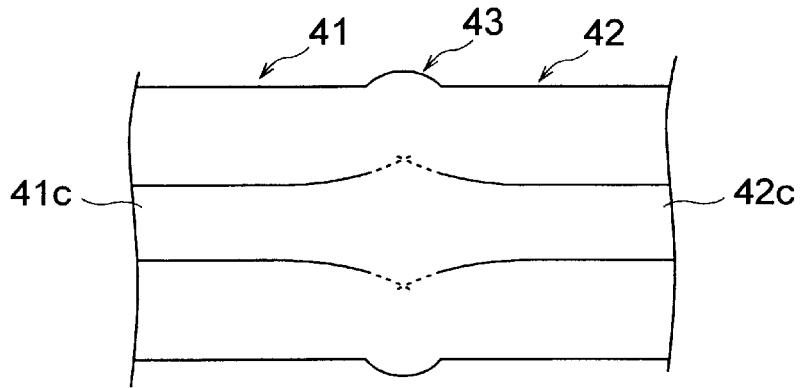

FIGS. 10A to 10C are views showing specific examples of the dispersion-compensating module according to the fourth embodiment. A specific structure of the fused portion 43 can be realized when, as shown in FIG. 10A for example, the core region 41a of the dispersion-compensating optical fiber 41 and the core region 42a of the single-mode optical fiber 42 are fused together while their optical axes AX1, AX2 are shifted from each other by a predetermined distance D. It can also be realized when, as shown in FIG. 10B, the dispersion-compensating optical fiber 41 and the single-mode optical fiber 42 are fusion-spliced to each other while each of the core region 41b of the dispersion-compensating optical fiber 41 and the core region 42b of the single-mode optical fiber 42 is minutely bent. Further, as shown in FIG. 10C, the core region 41c of the dispersion-compensating optical fiber 41 and the core region 42c of the single-mode optical fiber 42 may be configured so as to expand their diameters toward the fused portion 43. These specific examples can be combined. For example, in the fused portion 43, the radius of bend of the core region may be expanded, or structures of bending the core region may be combined together. In each of these cases, the deviation of total loss in the optical transmission line 2 and dispersion-compensating module 40 can be kept at 0.1 dB or less in the wavelength band of 1.53 μm to 1.57 μm.

Since graphs showing the relationships between transmission loss and wavelength in the dispersion-compensating module 40 according to the fourth embodiment are similar to FIGS. 2A to 2E, operations of the dispersion-compensating module 40 will be explained with reference to these graphs.

As shown in FIGS. 2A and 2B, each of the optical transmission line 2 and dispersion-compensating optical fiber 41 has a transmission loss which becomes smaller as the wavelength is longer in general in the wavelength band of 1.53 μm to 1.57 μm, thus yielding a negative loss slope. In contrast, as shown in FIG. 2C, one of the amount of shift of optical axes, amount o f bending of optical axes, and expanded core diameter of the fused portion 43, which is the loss-equalizing device, is designed such that its transmission loss becomes greater as the wavelength is longer, so as to be able, to effectively compensate for wavelength-dependent loss deviations of the optical transmission line 2 and dispersion-compensating optical fiber 41.

Therefore, as shown in FIG. 2D, the total loss in the dispersion-compensating module 40 is the sum of respective losses in the dispersion-compensating optical fiber 41 and the fused portion 43, and becomes greater as the wavelength is longer in the wavelength band of 1.53 μm to 1.57 μm, thus yielding a positive loss slope. As shown in FIG. 2E, the total loss in the optical transmission line 2 and the dispersion-compensating module 40 is the sum of their respective losses, and yields a deviation of 0.1 dB or less in the wavelength band of 1.53 μm to 1.57 μm.

Figure 11:
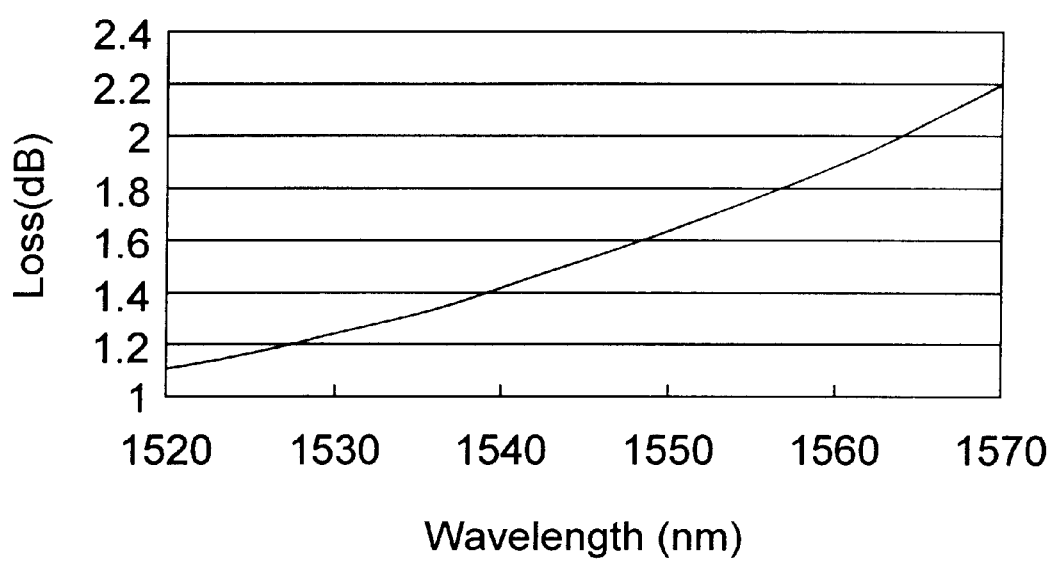
FIG. 11 is a graph showing an example of the loss wavelength characteristic of the fused portion shown in FIGS. 10A to 10C.

FIG. 11 is a graph showing an example of the loss wavelength characteristic of the fused portion. As shown in this graph, the loss slope of this fused portion is positive in the wavelength band of 1.53 μm to 1.57 μm. This loss slope can be adjusted by the amount of shift of optical axes, the amount of bending of optical axes, and the expanded core diameter.

As mentioned in the foregoing, when the SMF is used as the optical transmission line 2, the loss slope of the optical transmission line 2 in the wavelength band of 1.53 μm to 1.57 μm is negative in this embodiment as well. Therefore, if the loss slope of the whole dispersion-compensating module 40 is set positive, then the total loss in the optical transmission line 2 and the dispersion-compensating module 40 can fall within an appropriate range.

Also, since the SMF employed as the optical transmission line 2 has a loss slope per unit length (km) of about −0.000175 dB/nm/km in the wavelength band of 1.53 μm to 1.57 μm, letting L (km) be the fiber length of the optical transmission line 2, and α be the absolute value of a permissible manufacturing error, the loss slope (dB/nm) of the whole dispersion-compensating module 40 in the wavelength band of 1.53 μm to 1.57 μm is preferably a value which is greater than 0 but not greater than 0.000175×L+α.

Though the fusion connection between the dispersion-compensating optical fiber 41 and the SMF 42 is explained in the fourth embodiment, the configuration of the fused portion 43 should not be restricted thereto. For example, an SMF may be used in place of the dispersion-compensating optical fiber 41, and a dispersion-compensating optical fiber or other optical fibers may be used in place of the SMF 42. In any case, if the wavelength dependence of transmission loss in the fused portion therebetween is adjusted, then the wavelength dependence of the total loss in the optical transmission line and dispersion-compensating module can be weakened.

Fifth Embodiment

Figure 12:
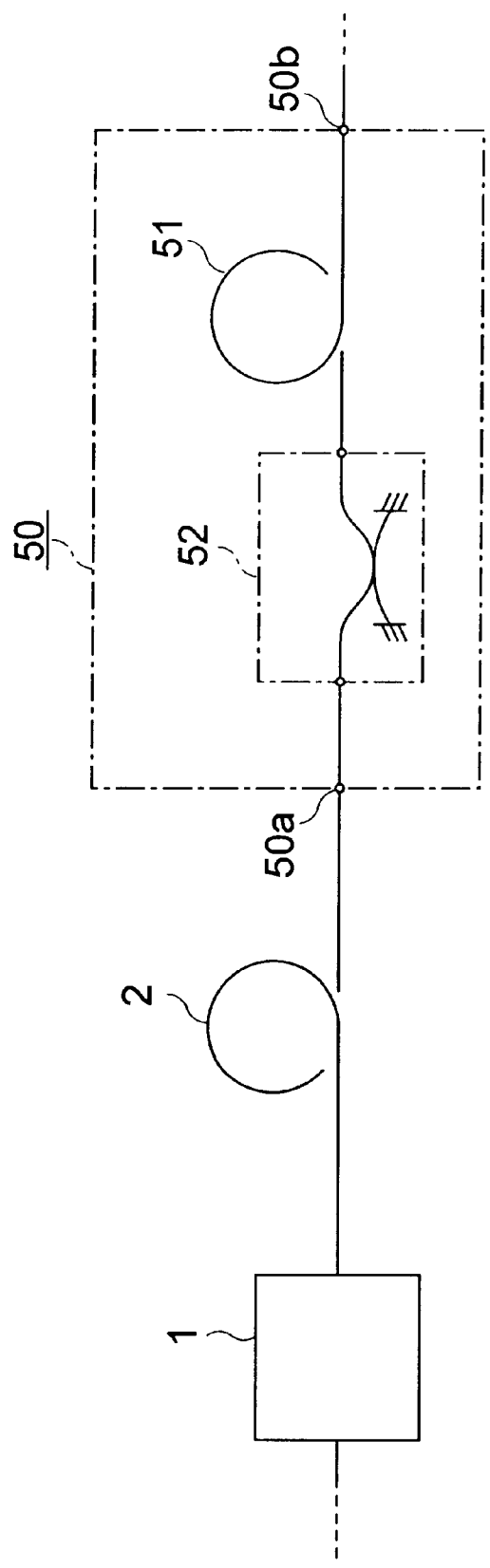
FIG. 12 is a view showing a schematic configuration of a fifth embodiment of the dispersion-compensating module according to the present invention.

A fifth embodiment of the dispersion-compensating module according to the present invention will now be explained. FIG. 12 is a view showing a schematic configuration of the dispersion-compensating module according to the fifth embodiment. This drawing shows, in addition to the dispersion-compensating module 50 according to this embodiment, a repeater 1 disposed upstream of the dispersion-compensating module 50, and an optical transmission line 2 between the repeater 1 and the dispersion-compensating module 50.

The dispersion-compensating module 50 according to this embodiment is disposed in a state where a dispersion-compensating device and a loss-equalizing device are optically connected to each other in the optical path between an input end 50a and an output end 50b. Specifically, this embodiment comprises a dispersion-compensating optical fiber 51 as the dispersion-compensating device and a fiber fusion type coupler (WDM coupler) 52 as the loss-equalizing device. The WDM coupler 52 preferably has a polarization-dependent loss (PDL) of 0.2 dB or less.

The dispersion-compensating optical fiber 51 is an optical device which compensates for the chromatic dispersion in the WDM signal wavelength band of the optical transmission line into which the dispersion-compensating module 50 is inserted. The WDM coupler 52 is obtained by fusing together two optical fibers disposed in parallel; and, its fusion conditions and coupling length are appropriately selected such that, for example, the transmission loss at a wavelength of 1520 nm is minimized, while the transmission loss at a wavelength of 1570 nm is maximized, whereby wavelength-dependent loss deviations of the optical transmission line 2 and dispersion-compensating optical fiber 51 are compensated for. As a consequence, the wavelength dependence of the total loss in the optical transmission line 2 and dispersion-compensating module 50 is weakened as a whole.

Since graphs showing the relationships between transmission loss and wavelength in the dispersion-compensating module 50 according to the fifth embodiment are similar to FIGS. 2A to 2E, operations of the dispersion-compensating module 50 will be explained with reference to these graphs.;

As shown in FIGS. 2A and 2B, each of the optical transmission line 2 and dispersion-compensating optical fiber 51 has a transmission loss which becomes smaller as the wavelength is longer in general in the wavelength band of 1.53 μm to 1.57 μm, thus yielding a negative loss slope.

In contrast, as shown in FIG. 2C, the fusion conditions and coupling length of the WDM coupler 52, which is the loss-equalizing device, are designed such that its transmission loss becomes greater as the wavelength is longer, so as to be able to effectively compensate for wavelength-dependent loss deviations of the optical transmission line 2 and dispersion-compensating optical fiber 51.

Therefore, as shown in FIG. 2D, the total loss in the dispersion-compensating module 50 is the sum of respective losses in the dispersion-compensating optical fiber 51 and the WDM coupler 52, and becomes greater as the wavelength is longer in the wavelength band of 1.53 μm to 1.57 μm, thus yielding a positive loss slope. As shown in FIG. 2E, the total loss in the optical transmission line 2 and the dispersion-compensating module 50 is the sum of their respective losses, and yields a deviation of 0.1 dB or less in the wavelength band of 1.53 μm to 1.57 μm.

As mentioned in the foregoing, when the SMF is used as the optical transmission line 2, the loss slope of the optical transmission line 2 in the wavelength band of 1.53 μm to 1.57 μm is negative in this embodiment as well. Therefore, if the loss slope of the whole dispersion-compensating module 50 is set positive, then the total loss in the optical transmission line 2 and dispersion-compensating module 50 can fall within an appropriate range.

Also, since the SMF employed as the optical transmission line 2 has a loss slope per unit length (km) of about −0.000175 dB/nm/km (=dB/(nm·km)) in the wavelength band of 1.53 μm to 1.57 μm, letting L (km) be the fiber length of the optical transmission line 2, and α be the absolute value of a permissible manufacturing error, the loss slope (dB/nm) of the whole dispersion-compensating module 50 in the wavelength band of 1.53 μm to 1.57 μm is preferably a value which is greater than 0 but not greater than 0.000175×L+α.

Here, the loss slope of the WDM coupler 52 is adjusted by appropriately setting the fusion conditions and coupling length such that the loss slope of the whole dispersion-compensating module 50 falls within the range mentioned above in view of the loss slope of the dispersion-compensating optical fiber 51.

Sixth Embodiment

Figure 13:
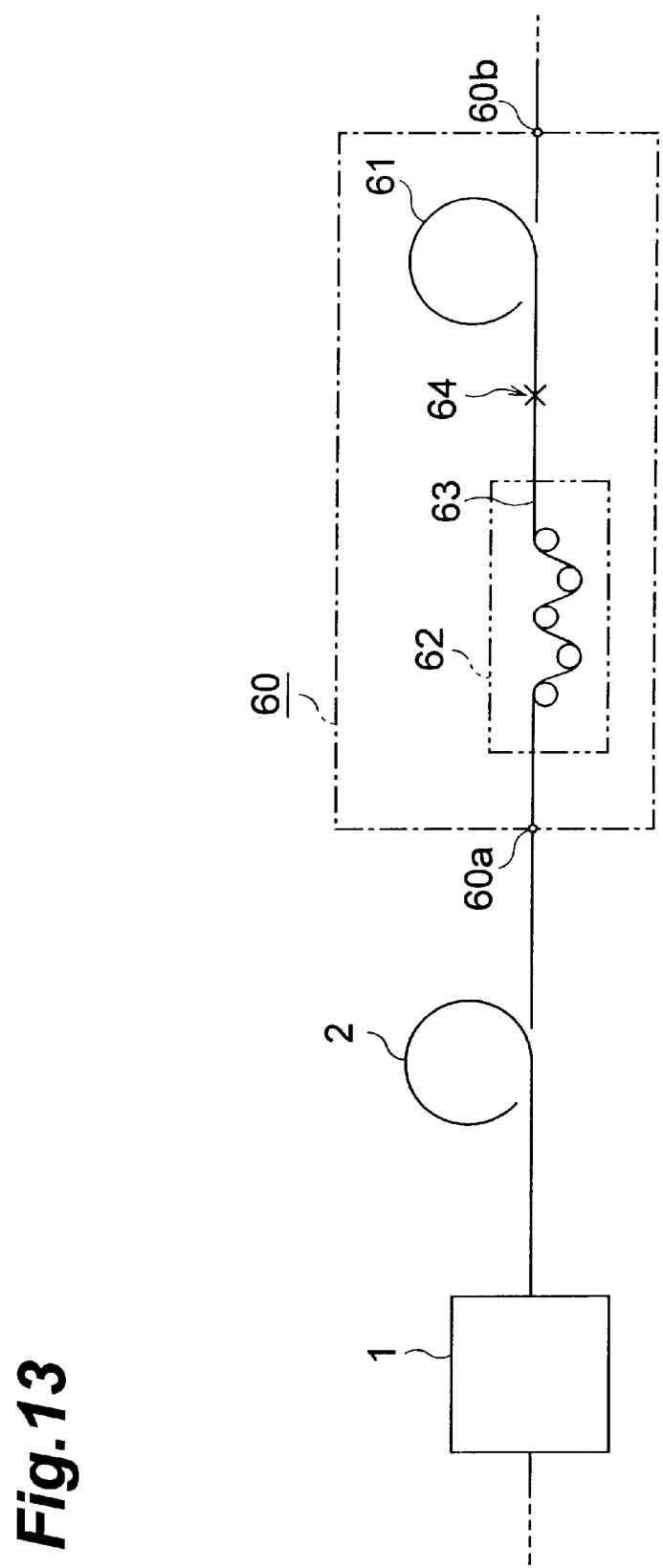
FIG. 13 is a view showing a schematic configuration of a sixth embodiment of the dispersion-compensating module according to the present invention.

A sixth embodiment of the dispersion-compensating module according to the present invention will now be explained. FIG. 13 is a view showing a schematic configuration of the dispersion-compensating module according to the sixth embodiment. This drawing shows, in addition to the dispersion-compensating module 60 according to this embodiment, a repeater 1 disposed upstream of the dispersion-compensating module 60, and an optical transmission line 2 between the repeater 1 and the dispersion-compensating module 60.

The dispersion-compensating module 60 according to this embodiment has an input end 60a and an output end 60b, and is disposed in a state where a dispersion-compensating device and a loss-equalizing device are optically connected to each other in the optical path between the input end 60a and the output end 60b. In particular, the dispersion-compensating module 60 is constituted by a dispersion-compensating optical fiber 61, as the dispersion-compensating device, and an optical fiber 63 having a bent portion 62, as the loss-equalizing device, which are fusion-spliced to each other at a connecting portion 64. The optical fiber 63 is preferably an SMF or dispersion-compensating optical fiber having a zero-dispersion wavelength in a 1.3-μm wavelength band. It is also preferable that the optical fiber 63 be common with the dispersion-compensating optical fiber 61.

The dispersion-compensating optical fiber 61 is an optical device for compensating for the chromatic dispersion in the WDM signal wavelength band of the optical transmission line into which the dispersion-compensating module 60 is inserted. In the bent portion 62, a plurality of parts of the optical fiber 63 are bent at a predetermined curvature over a predetermined length. The bent portion 62 is designed by appropriately selecting the length and curvature such that, for example, the transmission loss at a wavelength of 1520 nm is minimized, while the transmission loss at a wavelength of 1570 nm is maximized, whereby wavelength-dependent loss deviations of the optical transmission line 2 and dispersion-compensating optical fiber 61 are compensated for. As a consequence, the wavelength dependence of the total loss in the optical transmission line 2 and dispersion-compensating module 60 is weaker than that of the respective loss deviations of the dispersion-compensating optical fiber 61 and the bent portion 62.

Since graphs showing the relationships between transmission loss and wavelength in the dispersion-compensating module 60 according to the sixth embodiment are similar to FIGS. 2A to 2E, operations of the dispersion-compensating module 60 will be explained with reference to these graphs.

As shown in FIGS. 2A and 2B, each of the optical transmission line 2 and dispersion-compensating optical fiber 61 has a transmission loss which becomes smaller as the wavelength is longer in general in the wavelength band of 1.53 $\mu$m to 1.57 $\mu$m, thus yielding a negative loss slope. In contrast, as shown in FIG. 2C, the bent portion 60, which is the loss-equalizing device, is designed such that its transmission loss becomes greater as the wavelength is longer, so as to be able to effectively compensate for wavelength-dependent loss deviations of the optical transmission line 2 and dispersion-compensating optical fiber 61.

Therefore, as shown in FIG. 2D, the total loss in the dispersion-compensating module 60 is the sum of respective losses in the dispersion-compensating optical fiber 61 and the bent portion 62, and becomes greater as the wavelength is longer in the wavelength band of 1.53 $\mu$m to 1.57 $\mu$m, thus yielding a positive loss slope. As shown in FIG. 2E, the total loss in the optical transmission line 2 and the dispersion-compensating module 60 is the sum of their respective losses, and yields a deviation of 0.1 dB or less in the wavelength band of 1.53 $\mu$m to 1.57 $\mu$m.

As mentioned in the, foregoing, when the SMF is used as the optical transmission line 2, the loss slope of the optical transmission line 2 in the wavelength band of 1.53 $\mu$m to 1.57 $\mu$m is negative in this embodiment as well. Therefore, if the loss slope of the whole dispersion-compensating module 60 is set positive, then the total loss in the optical transmission line 2 and dispersion-compensating module 60 can fall within an appropriate range.

Also, since the SMF employed as the optical transmission line 2 has a loss slope per unit length (km) of about −0.000175 dB/nm/km (=dB/(nm·km)) in the wavelength band of 1.53 $\mu$m to 1.57 $\mu$m, letting L (km) be the fiber length of the optical transmission line 2, and $\alpha$ be the absolute value of a permissible manufacturing error, the loss slope (dB/nm) of the whole dispersion-compensating module 60 in the wavelength band of 1.53 $\mu$m to 1.57 $\mu$m is preferably a value which is greater than 0 but not greater than 0.000175×L+$\alpha$.

Here, the loss slope of the whole dispersion-compensating module 60 is, set by appropriately setting the length and curvature of the bent portion 62 so as to adjust the loss slope of the bent portion 62.

In each of the above-mentioned first to sixth embodiments, either the dispersion-compensating device or the loss-equalizing device may be disposed upstream of the other. In view of influences of nonlinear optical phenomena (four-wave mixing in particular), however, it is preferable that the loss-equalizing device be disposed upstream of the dispersion-compensating device. Namely, as a consequence, signal light enters the dispersion-compensating device after incurring a loss due to the loss-equalizing device, whereby nonlinear optical phenomena such as four-wave mixing and the like are effectively restrained from occurring.

In accordance with the present invention, as explained in the foregoing, the dispersion of the optical transmission line in the wavelength band of 1.53 $\mu$m to 1.57 $\mu$m is compensated for by the dispersion-compensating device, whereas the loss deviations of the optical transmission line and dispersion-compensating device in the wavelength band of 1.53 $\mu$m to 1.57 $\mu$m are compensated for by the loss-equalizing device. Namely, not only the dispersion of the optical transmission line is compensated for, but also the wavelength dependence of the total loss in the optical transmission line and dispersion-compensating module is weaker. As a consequence, the intensity level deviations among individual wavelengths of the WDM signal reaching the receiving station are small, and each wavelength component of the WDM signal reaches the receiving station with a sufficient intensity level and SN ratio, whereby no reception error occurs in the receiving station.

In particular, since the dispersion-compensating module as a whole has a positive loss slope in the wavelength band of 1.53 $\mu$m to 1.57 $\mu$m with respect to an optical transmission line made of an SMF having a zero-dispersion wavelength in the wavelength band of 1.3 $\mu$m (whereas the optical transmission line has a negative loss slope in the wavelength band of 1.53 $\mu$m to 1.57 $\mu$m), the total loss in the optical transmission line and dispersion-compensating module can fall within an appropriate range.

Also, letting L (km) be the fiber length of the optical transmission line, and $\alpha$ be the absolute value of a permissible manufacturing error, the loss slope (dB/nm) of the dispersion-compensating module in the wavelength band of 1.53 $\mu$m to 1.57 $\mu$m is a value which is greater than 0 but not greater than 0.000175×L+$\alpha$. Since the optical transmission line made of an SMF having a zero-dispersion wavelength in the wavelength band of 1.3 $\mu$m is about −0.000175 dm/nm/km in the wavelength band of 1.53 $\mu$m to 1.57 $\mu$m; even if the loss slope of the optical transmission line in the wavelength band of 1.53 $\mu$m to 1.57 $\mu$m has a fluctuation, the total loss in the optical transmission line and dispersion-compensating module can fall within an appropriate range when the loss slope of the whole dispersion-compensating module is set to a value within the range mentioned above.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Applications No. 343115/1998 filed on Dec. 2, 1998 is hereby incorporated by reference.

What is claimed is:

1. A dispersion-compensating module to be installed at a predetermined position on an optical transmission line having a predetermined length, said dispersion-compensating module having a positive loss slope in a 1.55-$\mu$m wavelength band and constituting a part of said optical transmission line, said dispersion-compensating module comprising:

a dispersion-compensating device for compensating for the dispersion of said optical transmission line in the 1.55-μm wavelength band; and a loss-equalizing device for adjusting the total loss slope of said optical transmission line including said dispersion-compensating module such that a loss deviation between individual signal wavelengths in the 1.55-μm wavelength band caused by propagation in said optical transmission line and dispersion-compensating device falls within an appropriate range, wherein said loss-equalizing device includes an optical fiber formed with a long-period grating in which a propagation mode and a radiation mode are coupled to each other.

2. A dispersion-compensating module according to claim 1, wherein said dispersion-compensating device includes said loss equalizing device.

3. A dispersion-compensating module to be installed at a predetermined position on an optical transmission line having a predetermined length, said dispersion-compensating module having a positive loss slope in a 1.55-μm wavelength band and constituting a part of said optical transmission line, said dispersion-compensating module comprising:

a dispersion-compensating device for compensating for the dispersion of said optical transmission line in the 1.55-μm wavelength band; and a loss-equalizing device, which has no structure for providing a gain, for adjusting the total loss slope of said optical transmission line including said dispersion-compensating module such that a loss deviation between individual signal wavelengths in the 1.55-μm wavelength band caused by propagation in said optical transmission line and dispersion-compensating device falls within an appropriate range, wherein said loss-equalizing device consists of an optical fiber comprising a core region doped with a transition metal, and a cladding region disposed at an outer periphery of said core region; said optical fiber securing a single mode in the 1.55-μm wavelength band.

4. A dispersion-compensating module to be installed at a predetermined position on an optical transmission line having a predetermined length, said dispersion-compensating module having a positive loss slope in a 1.55-μm wavelength band and constituting a part of said optical transmission line, said dispersion-compensating module comprising:

a dispersion-compensating device for compensating for the dispersion of said optical transmission line in the 1.55-μm wavelength band; and a loss-equalizing device for adjusting the total loss slope of said optical transmission line including said dispersion-compensating module such that a loss deviation between individual signal wavelengths in the 1.55-μm wavelength band caused by propagation in said optical transmission line and dispersion-compensating device falls within an appropriate range, wherein said loss-equalizing device includes a fused portion obtained by fusion-splicing respective end portions of a pair of optical fibers, wherein respective optical axes of said pair of optical fibers are shifted from each other in said fused portion.

5. A dispersion-compensating module to be installed at a predetermined position on an optical transmission line having a predetermined length, said dispersion-compensating module having a positive loss slope in a 1.55-μm wavelength band and constituting a part of said optical transmission line, said dispersion-compensating module comprising:

a dispersion-compensating device for compensating for the dispersion of said optical transmission line in the 1.55-μm wavelength band; and a loss-equalizing device for adjusting the total loss slope of said optical transmission line including said dispersion-compensating module such that a loss deviation between individual signal wavelengths in the 1.55-μm wavelength band caused by propagation in said optical transmission line and dispersion-compensating device falls within a appropriate range, wherein said loss-equalizing device includes a fused portion obtained by fusion-splicing respective end portions of a pair of optical fibers, wherein respective core regions of said pair of optical fibers are bent in said fused portion.

6. A dispersion-compensating module to be at installed at a predetermined position on an optical transmission line having a predetermined length, said dispersion-compensating module having a positive loss slope in a 1.55-μm wavelength band and constituting a part of said optical transmission line, said dispersion-compensating module comprising:

a dispersion-compensating device for compensating for the dispersion of said optical transmission line in the 1.55-μm wavelength band; and a loss-equalizing device for adjusting the total loss slope of said optical transmission line including said dispersion-compensating module such that a loss deviation between individual signal wavelengths in the 1.55-μm wavelength band caused by propagation in said optical transmission line and dispersion-compensating device falls within an appropriate range, wherein said loss-equalizing device includes a fused portion obtained by fusion-splicing respective end portions of a pair of optical fibers, wherein said pair of optical fibers have respective core regions each having an outside diameter expending toward said fused portion.

7. A dispersion-compensating module to be installed at a predetermined position on an optical transmission line having a predetermined length, said dispersion-compensating module having a positive loss slope in a 1.55-μm wavelength band and constituting a part of said optical transmission line, said dispersion-compensating module comprising:

a dispersion-compensating device for compensating for the dispersion of said optical transmission line in the 1.55-μm wavelength band; and a loss-equalizing device for adjusting the total loss slope of said optical transmission line including said dispersion-compensating module such that a loss deviation between individual signal wavelengths in the 1.55-μm wavelength band caused by propagation in said optical transmission line and dispersion-compensating device falls within an appropriate range, wherein said loss-equalizing device includes a fiber coupler.

8. A dispersion-compensating module to be installed at a predetermined position on an optical transmission line having a predetermined length, said dispersion-compensating module having a positive loss slope in a 1.55-μm wavelength band and constituting a part of said optical transmission line; said dispersion-compensating module comprising:

a dispersion-compensating device for compensating for the dispersion of said optical transmission line in the 1.55-μm wavelength band; and a loss-equalizing device, which has no structure for providing a gain, for adjusting the total loss slope of said optical transmission line including said dispersion-compensating module such that a loss deviation between individual signal wavelengths in the 1.55-$\mu$m wavelength band caused by propagation in said optical transmission line and dispersion-compensating device falls within an appropriate range, wherein said loss-equalizing device consists of an optical fiber bent at one or more parts thereof, each of said parts having a curvature adjusted such that the wavelength dependence of the total loss slope becomes weaker.

* * * * *